United States Patent
Lacalle Bayo

(10) Patent No.: US 9,217,583 B2
(45) Date of Patent: Dec. 22, 2015

(54) METHOD FOR DRAINING THERMAL OIL IN A THERMOSOLAR PLANT, AND CORRESPONDING AUXILIARY INSTALLATION FOR CARRYING OUT SAID METHOD

(75) Inventor: Jesús Lacalle Bayo, Valencia (ES)

(73) Assignee: GD ENERGY SERVICES S.A.U., Valencia (ES)

( * ) Notice: Subject to any disclaimer, the term of this patent is extended or adjusted under 35 U.S.C. 154(b) by 171 days.

(21) Appl. No.: 14/342,402

(22) PCT Filed: Sep. 2, 2011

(86) PCT No.: PCT/ES2011/070621
§ 371 (c)(1),
(2), (4) Date: Mar. 3, 2014

(87) PCT Pub. No.: WO2013/030416
PCT Pub. Date: Mar. 7, 2013

(65) Prior Publication Data
US 2014/0202555 A1  Jul. 24, 2014

(51) Int. Cl.
*B08B 5/00* (2006.01)
*F24J 2/46* (2006.01)
*F24J 2/04* (2006.01)
*F24J 2/42* (2006.01)
*F03G 6/00* (2006.01)

(52) U.S. Cl.
CPC ................ *F24J 2/4627* (2013.01); *F03G 6/00* (2013.01); *F24J 2/04* (2013.01); *F24J 2/42* (2013.01); *F24J 2/4634* (2013.01); *F24J 2/4649* (2013.01); *Y02E 10/40* (2013.01); *Y10T 137/0419* (2015.04); *Y10T 137/6416* (2015.04); *Y10T 137/8593* (2015.04); *Y10T 137/86035* (2015.04)

(58) Field of Classification Search
CPC .. F24J 2/4627; F24J 2/4634; Y10T 137/0419; Y02B 10/22
USPC ............... 137/15.05; 126/569, 585, 611, 615, 126/638, 640, 641, 642
See application file for complete search history.

(56) References Cited

U.S. PATENT DOCUMENTS

| | | | | |
|---|---|---|---|---|
| 4,169,554 A * | 10/1979 | Camp | ..................... | F24F 3/001 126/610 |
| 4,237,862 A | 12/1980 | Embree | | |
| 4,691,692 A | 9/1987 | Conner, Jr. et al. | | |
| 8,607,779 B2 * | 12/2013 | Humphreys | ............... | F24J 2/42 126/640 |
| 2011/0079216 A1 * | 4/2011 | Descy | ................... | F24D 11/003 126/640 |

(Continued)

FOREIGN PATENT DOCUMENTS

| EP | 0653596 A2 | 5/1995 |
|---|---|---|
| EP | 2306116 A1 | 4/2011 |

*Primary Examiner* — John K Fristoe, Jr.
*Assistant Examiner* — Reinaldo Sanchez-Medina
(74) *Attorney, Agent, or Firm* — Richard M. Goldberg

(57) ABSTRACT

An installation for draining thermal oil in a thermosolar plant, and includes an oil tank (7), a pump assembly (6), a depressor or suction assembly (8), lines for communication with valves (11, 21), and a valve assembly for opening/closing the passage between the separate elements, with the lines for communication with the valves (11, 21) including pairs of pipes of the closed loop or branches (3, 4) that do not have valves on the free end thereof, with the installation operated by sweeping the separate circuits that form the installation by driving or suction according to the corresponding operation phase.

16 Claims, 11 Drawing Sheets

(56) References Cited

U.S. PATENT DOCUMENTS

2011/0094498 A1    4/2011    Newman et al.
2014/0076412 A1*   3/2014    Lacalle Bayo ............ F24J 2/04
                                                                                             137/15.04

* cited by examiner

METHOD FOR DRAINING THERMAL OIL IN A THERMOSOLAR PLANT, AND CORRESPONDING AUXILIARY INSTALLATION FOR CARRYING OUT SAID METHOD

A method for draining thermal oil at a thermal solar plant and auxiliary installations for implementing this method.

BACKGROUND OF THE INVENTION

This invention covers an enhanced method for draining thermal oil at a thermal solar plant in which the oil is extracted from a loop in the system, either for processing this oil or for carrying out maintenance operations on the loop. This method consists of a set of stages in which the relevant loop of the thermal solar plant is drained, cooled and refilled. The invention extends to an auxiliary drainage installation designed to carry out this method. This auxiliary unit is specifically a transportable installation.

Thermal solar plants normally comprise a set of mirrors reflecting the sun's radiation and a collection tube on which the radiation reflected by these mirrors is concentrated. A thermal fluid circulates through this tube which gradually heats up as it travels along the circuit through which it has to go.

Thermal solar installations comprise a main conduit of thermal oil in which the means for using this energy are located, as well as the pumping systems or heat exchangers. A set of branch circuits or loops extend from this main conduit, these normally being isolated from the main conduit by means of valves. Hence, any operation which has to be performed on this loop will not prevent the rest of the installation from working.

Thermal fluids involve a high environmental risk through toxicity, and also, at high temperatures, entail a great risk of inflammation or explosion if they come into contact with oxygen. At atmospheric pressure this temperature stands at about 113° C., that is, a temperature under that of the oil in the installation. Working with this type of fluid thus proves extremely dangerous when they are directly withdrawn from the installations. Apart from this, given that the solidification temperature of these oils is very high, around 12° C., they have to be extracted and stored at suitable temperatures, of from 50° C. to 80° C., at which the risk of explosion or inflammation is non-existent and which at the same time allow this to be handled in liquid state.

One subject of this invention is therefore to propose a method for extracting thermal oil from one or more loops in a thermal solar installation, as well as for feeding this back into the installation, which in different stages includes filling auxiliary conduits used for transporting the oil and reducing its temperature to an appropriate level, and later reinserting the oil into the installation and emptying the auxiliary conduits. The capacity of the number of loops in which the drainage operation can be carried out simultaneously will depend on the capacity for storing the thermal oil taken out.

As a second subject of this invention, this also proposes an installation for carrying out the method defined in the claims, which includes a vehicle fitted with pumping and suction means, an oil cooling device fitted with heat exchangers and means for dissipating the heat, auxiliary conduits and a set of manually or automatically operated valves.

STATE OF THE ART

The use of a Voith make vehicle, fitted with a tank in which the oil is collected at high temperature, and a pumping device for its reinsertion in the installation is well-known. The oil is allowed to cool down in this tank to an appropriate temperature of about 80° and is then poured back into the installation. In order to prevent ignition the tank into which the extracted oil is poured is a sealed tank into which nitrogen is injected, thus ruling out the presence of oxygen. Due to the high temperature at which the oil is collected and because the cooling takes place through contact between the air and the walls of the tank, which is also insulated, the processing times are nevertheless very long, and there is also a major risk of explosion until sufficient reduction of the oil temperature is ensured. The installation is discharged by scavenging with injected nitrogen, to prevent contact with air, which also entails high costs. No satisfactory automation has been accomplished by means of this system either.

SUMMARY OF THE INVENTION

The invention being proposed consists of an auxiliary installation for draining and cleaning the thermal oil in a thermal solar plant, normally a transportable installation, for example fitted on a vehicle or on the trailer of a vehicle, which comprises the following items:

An oil tank: the tank is heat-insulated and comprises heating means, for example by means of resistances: the appropriate temperature for handling this oil should be around 80°, at which the risk of ignition is very slight, and never under 12°, a temperature at which it solidifies and becomes impossible to handle;

A pumping system made up of at least one discharge pump which takes the oil from the tank and leads this to the following devices of the auxiliary installation;

An oil cooler; since the oil in the loop is at a high temperature, of around 400°, and cannot be processed at this temperature (apart from the danger of inflammation), a set of heat exchangers are fitted, normally but not necessarily arranged in series with each other, which enable the temperature to be lowered sufficiently (normally to around 80°) to enable its treatment and operators' proximity to the tank and other zones, with no excessive exposure to heat nor to the risk of inflammation;

A depression or suction system; this depression system is used for draining some of the lines in the conduits forming the loop of the solar plant or the auxiliary conduits comprising the installation of the invention; the depression or suction assembly is fitted with the filters required for preventing the expulsion of any contaminating substances;

Conduits for communication between the different parts of the installation; and

Valves for opening/closing the different conduits, for their connection with the apparatus, for connection with the installation and for atmospheric outlet.

More specifically, conduits are arranged in a closed loop linking up with the respective inlet/outlet valves of the loop in the installation and a set of forks which will be described below when the preferential embodiment of the invention is explained.

This also comprises a pair of spools for reeling in the hoses for each of the oil inlet/outlet processes.

The drainage method according to the invention comprises the following operations:

The preliminary stage involves extending the hoses from the spools and connecting the ends of these hoses to the respective inlet and outlet valves of the loop in the plant which has to be drained;

After connecting the hoses, and with the loop valves closed, the outlet branch circuit, made up of a pair of hoses, proceeds to be filled with cold oil (cold oil will be the term used for the oil at its working temperature, normally from 50° C. to 80° C.). For this purpose oil from the tank is pumped through, which on its way back goes through the cooler towards the tank. The oil is forced to circulate until there is no air inside the conduits; the tank has its atmospheric outlet open;

After performing the previous operation, the valves of the outlet branch circuit are closed and the ones for the inlet branch circuit are opened; these two operations can be performed in any order;

With the inlet and outlet branch circuits full, the loop valves are opened and oil from the tank is forced through by means of the pump, and made to run through this loop; the hot oil is sent to the outlet branch circuit which will receive hot oil; the hot oil is made to run through a cooling device, before being returned to the oil tank; the oil is forced to circulate until the outlet temperature is essentially equal to the temperature of the incorporated oil;

After the oil in the loop is cooled (to a temperature of from 50° to 80°), this oil can now come into contact with the air with no danger; the atmospheric valves in the tank are closed and the suction system is connected, to make a vacuum in the tank, which sucks any oil found in the conduits and particularly from one of the hoses of each inlet and outlet branch circuit respectively, and consequently from the branch to which they are connected and with the corresponding valves opened; in this phase the pumping system is not run.

The valves of the hoses for the two branch circuits, closed until then, open at this point, with the suction continuing until the whole circuit is drained: the tank will now contain all the oil from the loop of the plant.

After performing the operations which have to be carried out on the loop of the thermal solar plant, the oil now needs to be put back into this, which is done as follows:

By opening the relevant valves, the pump will work by taking oil from the tank, which will be driven in to fill one of the branch circuits corresponding to one of the inlet/outlet valves in the loop of the thermal solar plant;

After one of the branch circuits has been filled, the other branch is then filled in the same way;

After filling the oil in the branch circuit, with a continuous cycle to prevent the presence of air bubbles, the valves for connecting the loop of the plant are then closed;

In this phase the suction system is then activated again by means of opening and closing the relevant valves, emptying first one branch circuit by means of an atmospheric intake;

By closing and opening the relevant set of valves, and with the suction systems running, the other branch circuit is drained.

With the conduits empty, it only remains to reel in the hoses, which is done automatically or semi-automatically.

BRIEF DESCRIPTION OF THE DRAWINGS

In order to illustrate the following explanation, eleven sheets of drawings are adjoined to this descriptive report, in which eleven figures schematically represent the installation and the status of each of the phases in the method, in which.

DESCRIPTION OF THE PREFERABLE EMBODIMENT OF THE INVENTION

Figure 1:
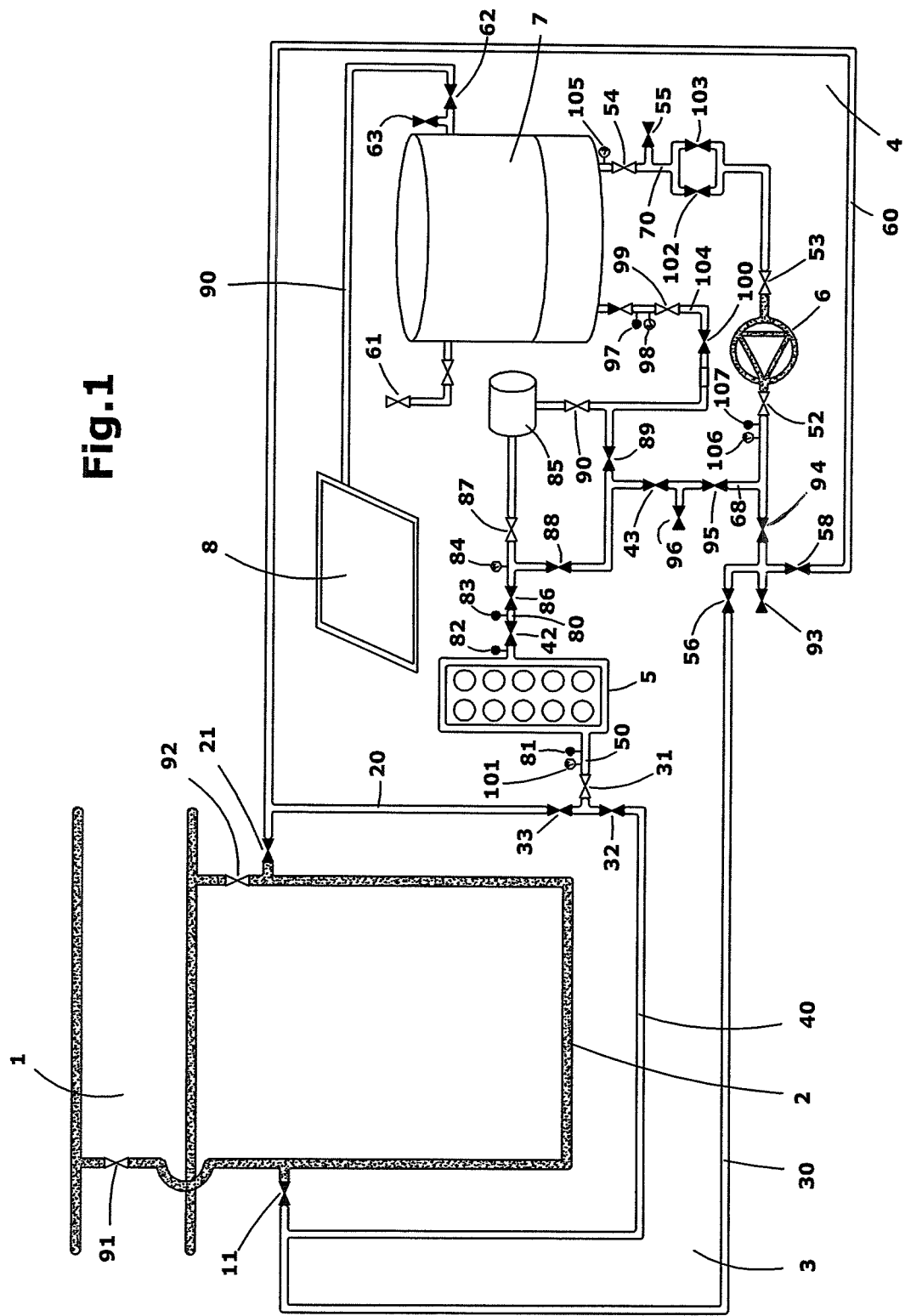
FIG. 1 shows a diagram of the auxiliary installation according to the invention in a phase prior to operating, in which the valves for connection with the loop of the plant have already been connected, but in which no operation has yet been performed.
Figure 2:
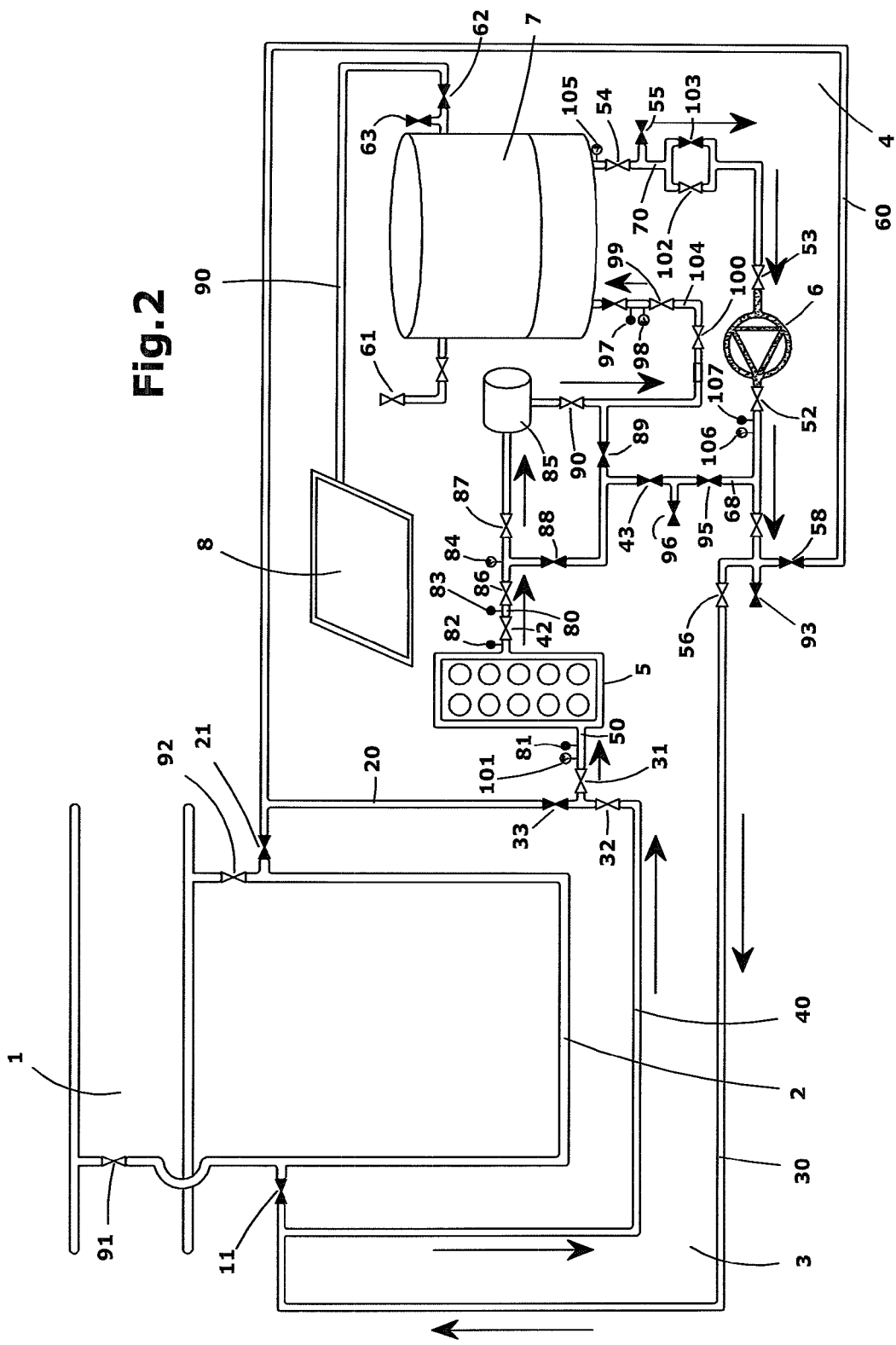
FIG. 2 shows a diagram of the auxiliary installation according to the invention running in a first phase in which the first circuit of the auxiliary installation is filled through the action of the pumping system.
Figure 3:
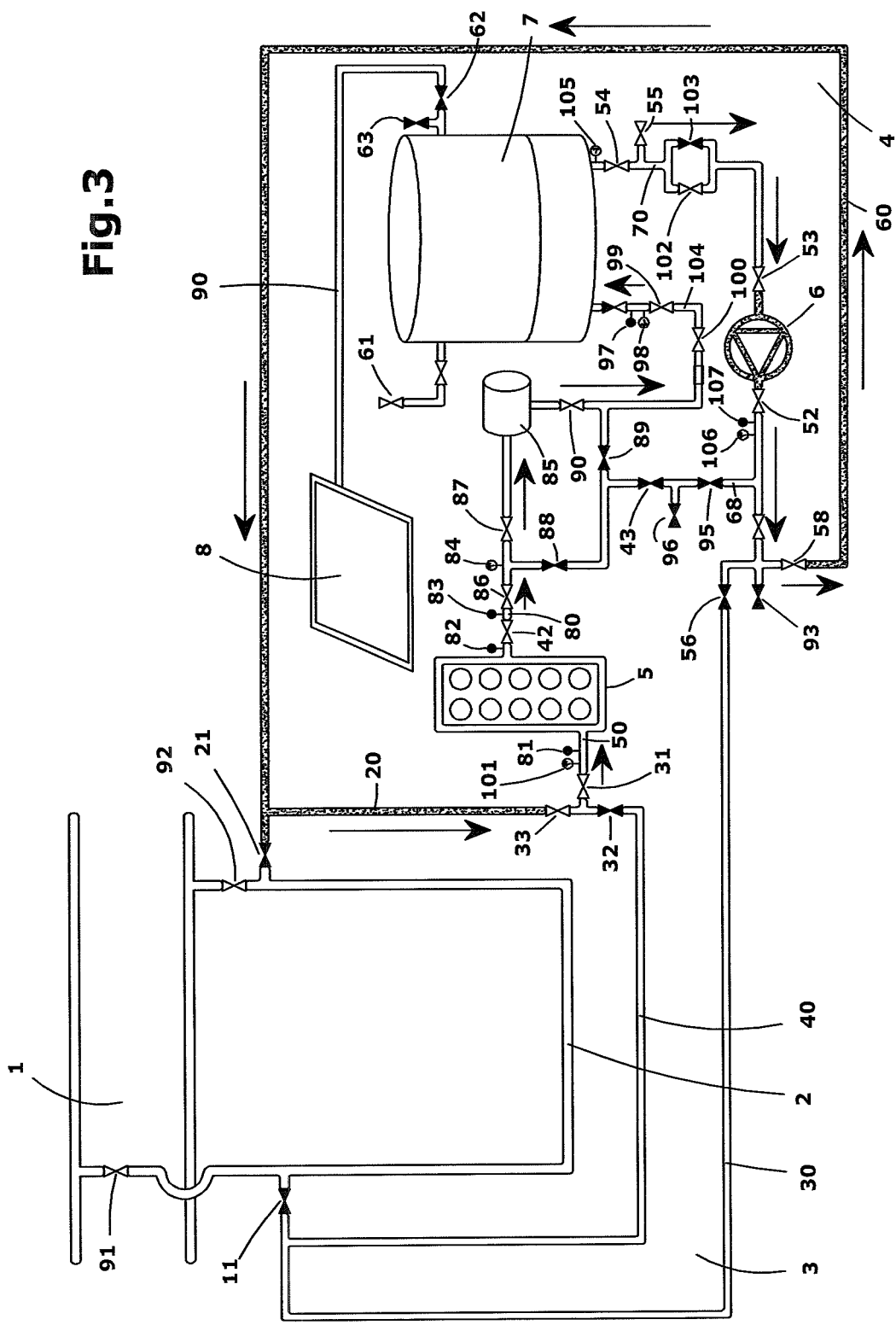
FIG. 3 shows a diagram of the auxiliary installation according to the invention operating in a second phase in which a second circuit of the auxiliary installation is filled through the action of the pumping system.
Figure 4:
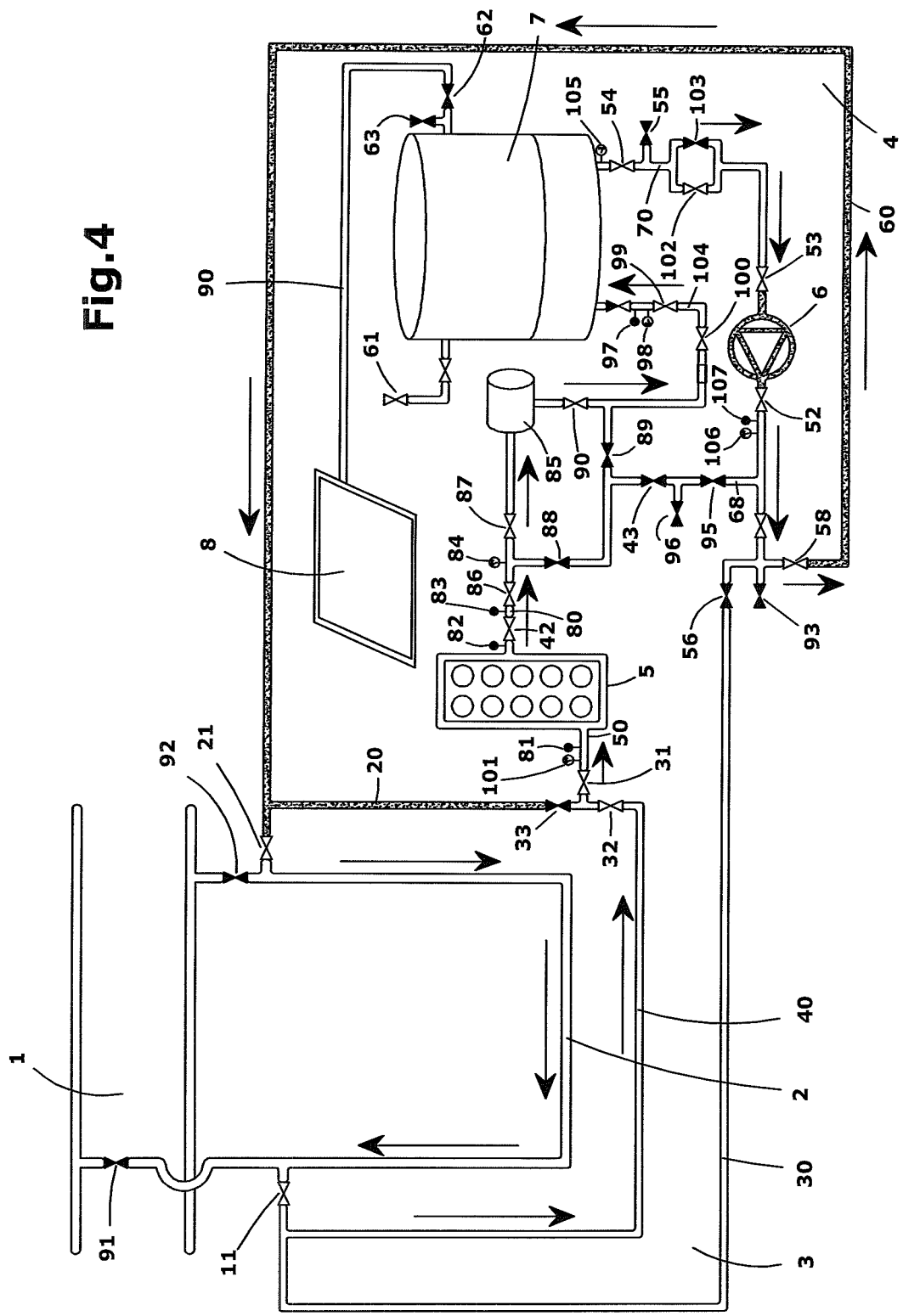
FIG. 4 shows a diagram of the auxiliary installation according to the invention running in a third phase in which the operation of the pumping systems scavenges the loop in the thermal solar installation, supplying cold oil (at the working temperature) and removing hot oil.
Figure 5:
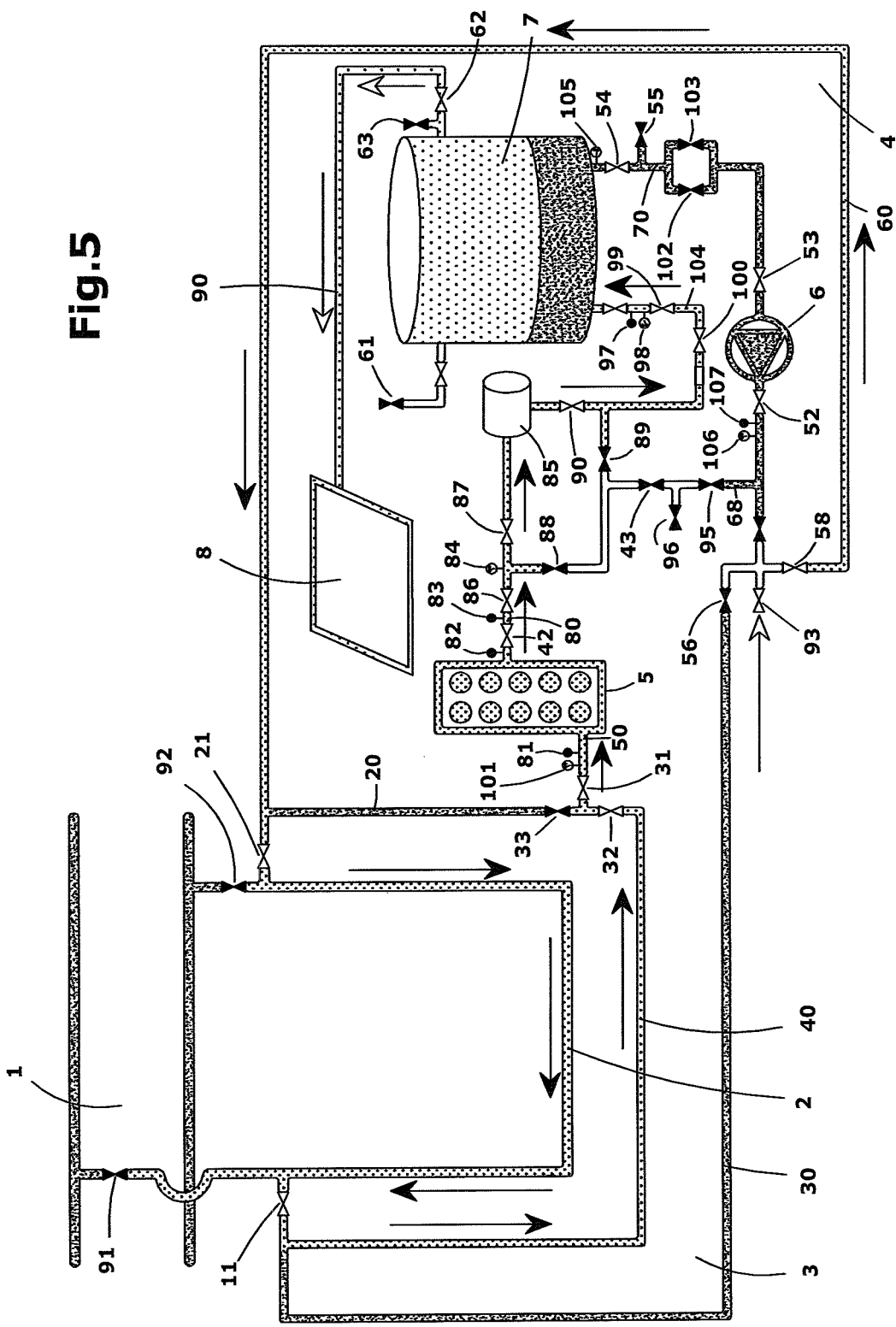
FIG. 5 shows a diagram of the auxiliary installation according to the invention operating in a fourth phase in which the suction device causes the drainage of one part of the conduits as well as the loop of the thermal solar plant, leading said oil to the tank of the auxiliary installation, and taking in air through an atmospheric intake.
Figure 6:
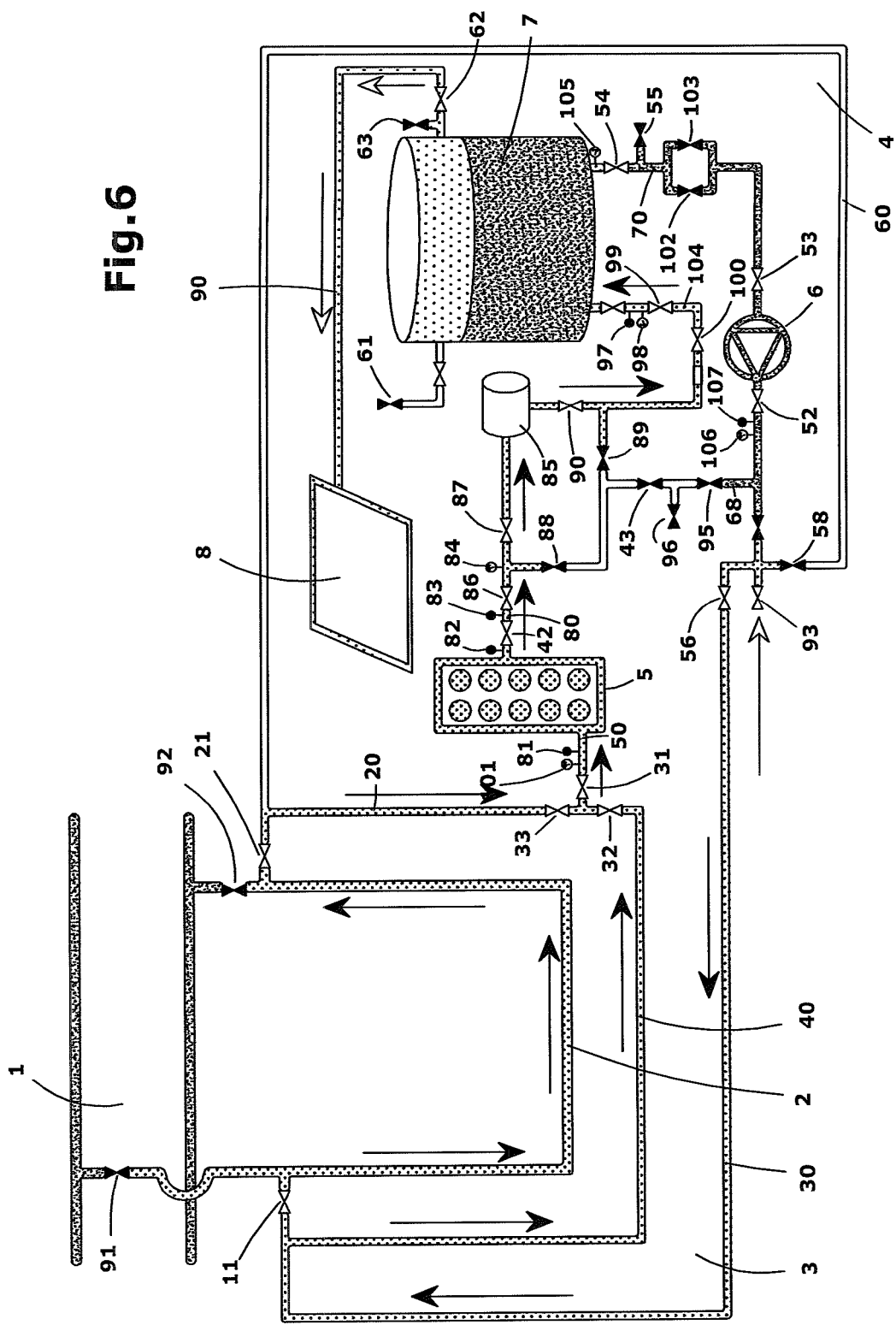
FIG. 6 shows a diagram of the auxiliary installation according to the invention operating in a fifth phase in which the suction systems also mean that the rest of the conduits for connection with the loop of the thermal solar plant are emptied, taking the oil to the auxiliary installation tank in the same way, leaving the loop in a position to be worked on for its repair or maintenance.
Figure 7:
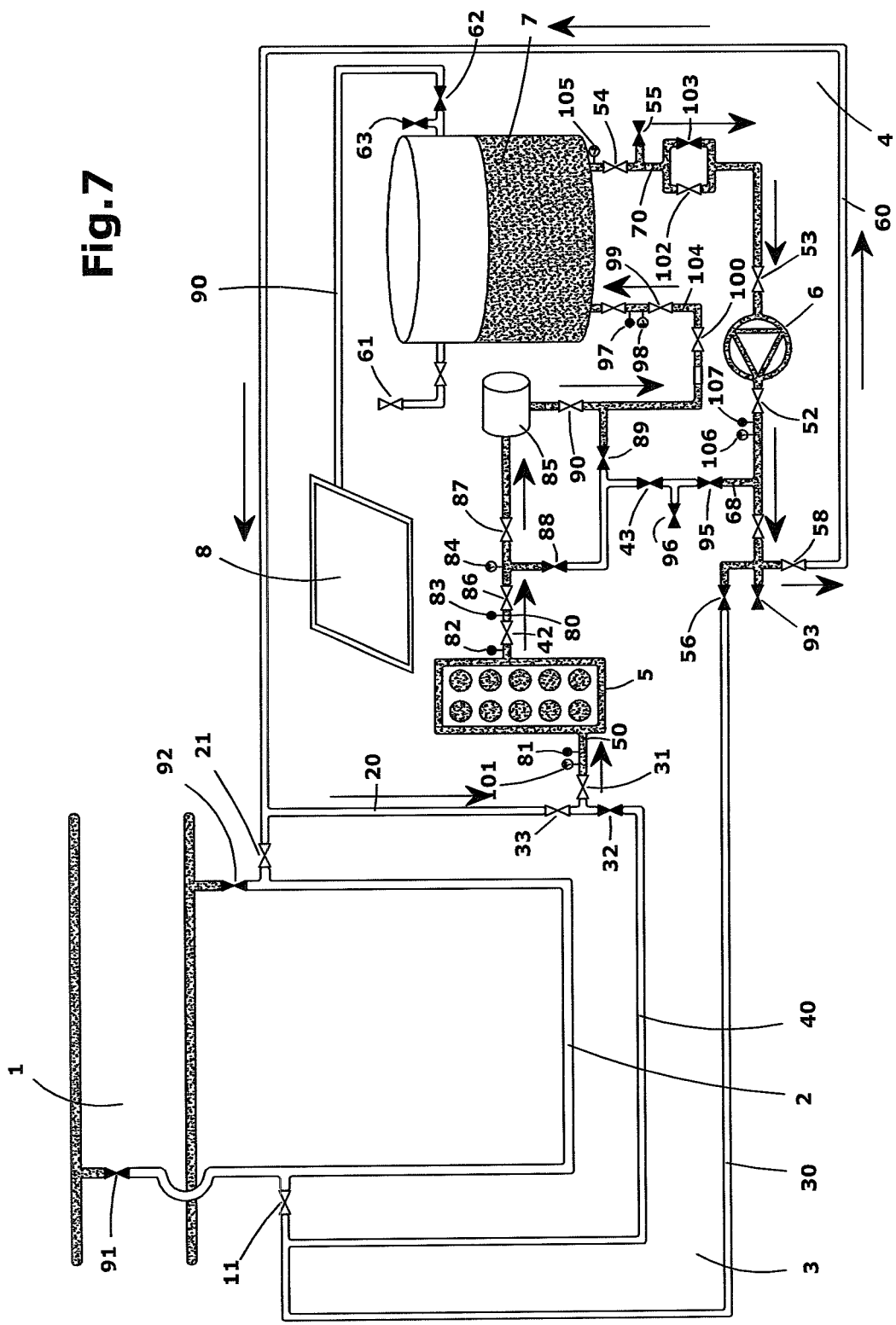
FIG. 7 shows a diagram of the auxiliary installation according to the invention running in a seventh phase in which the action of the pumping systems fills part of the conduits for connection with the loop of the thermal solar plant, taking the oil from the tank in the auxiliary installation.
Figure 8:
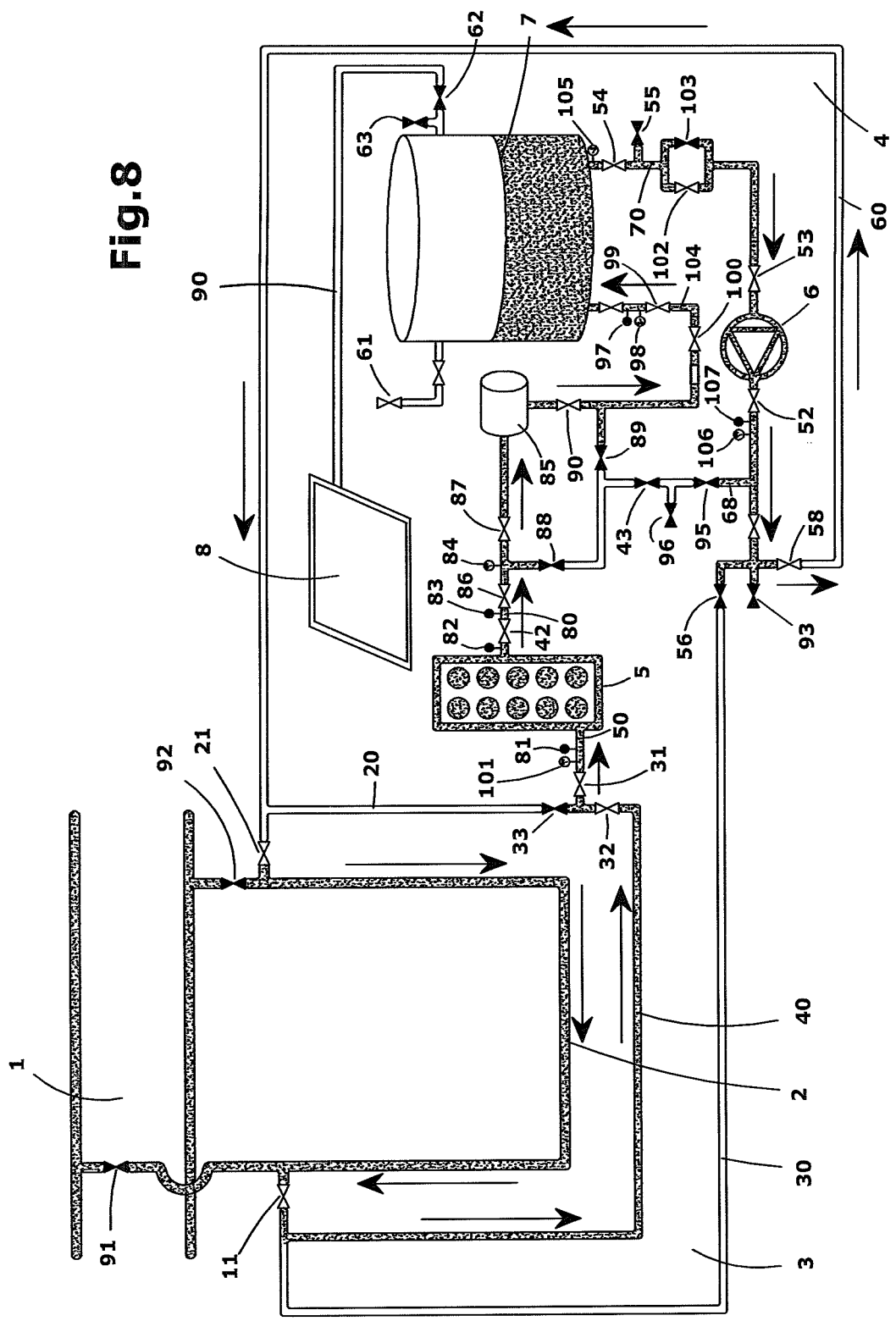
FIG. 8 shows a diagram of the auxiliary installation according to the invention running in an eighth phase in which the other conduits of the connection with the loop of the thermal solar plant are filled, also through the action of the pumping systems, taking the oil from the tank in the auxiliary installation in the same way.
Figure 9:
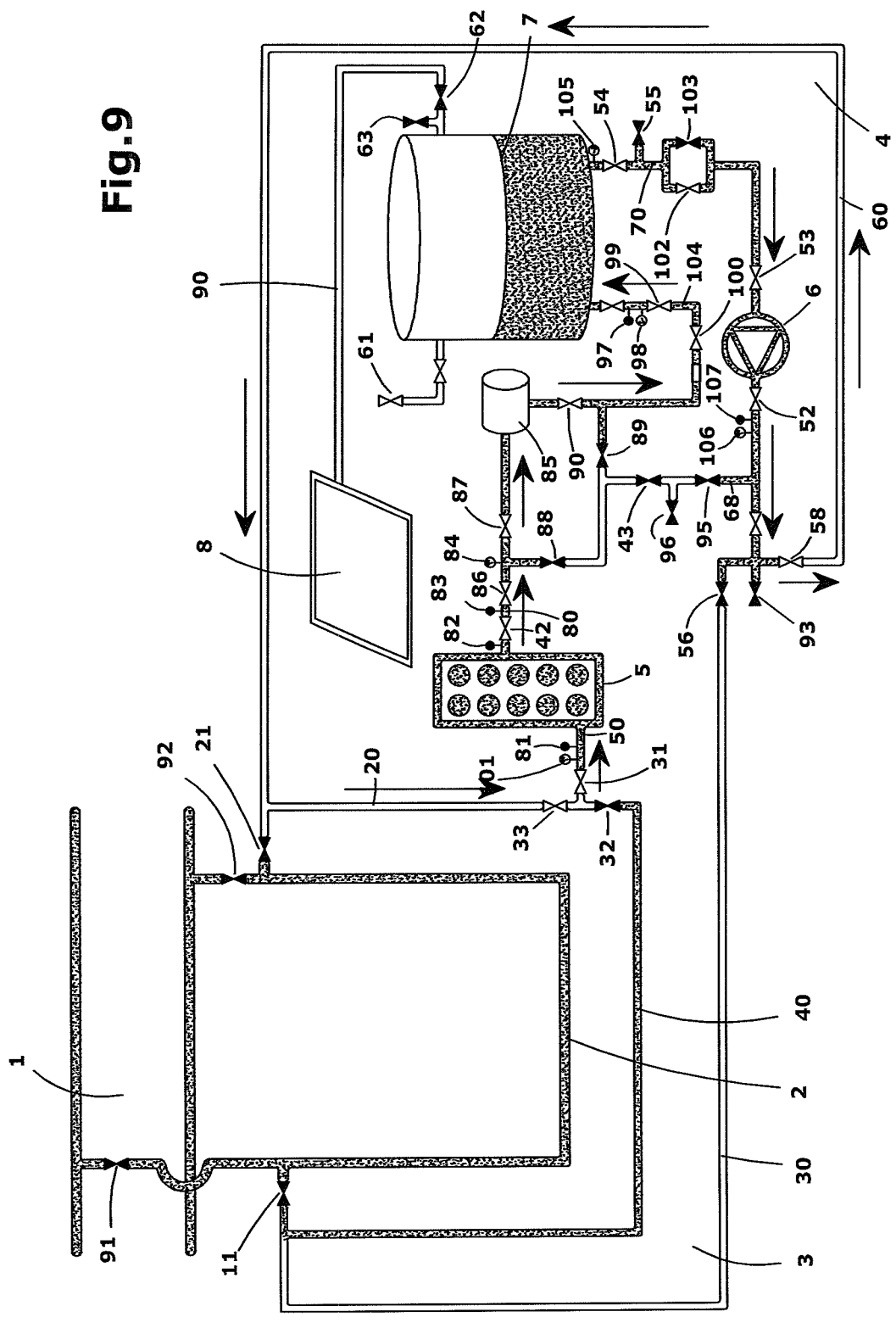
FIG. 9 shows a diagram of the auxiliary installation according to the invention, in a ninth phase in which the valves for connecting the loop of the thermal solar plant are closed.
Figure 10:
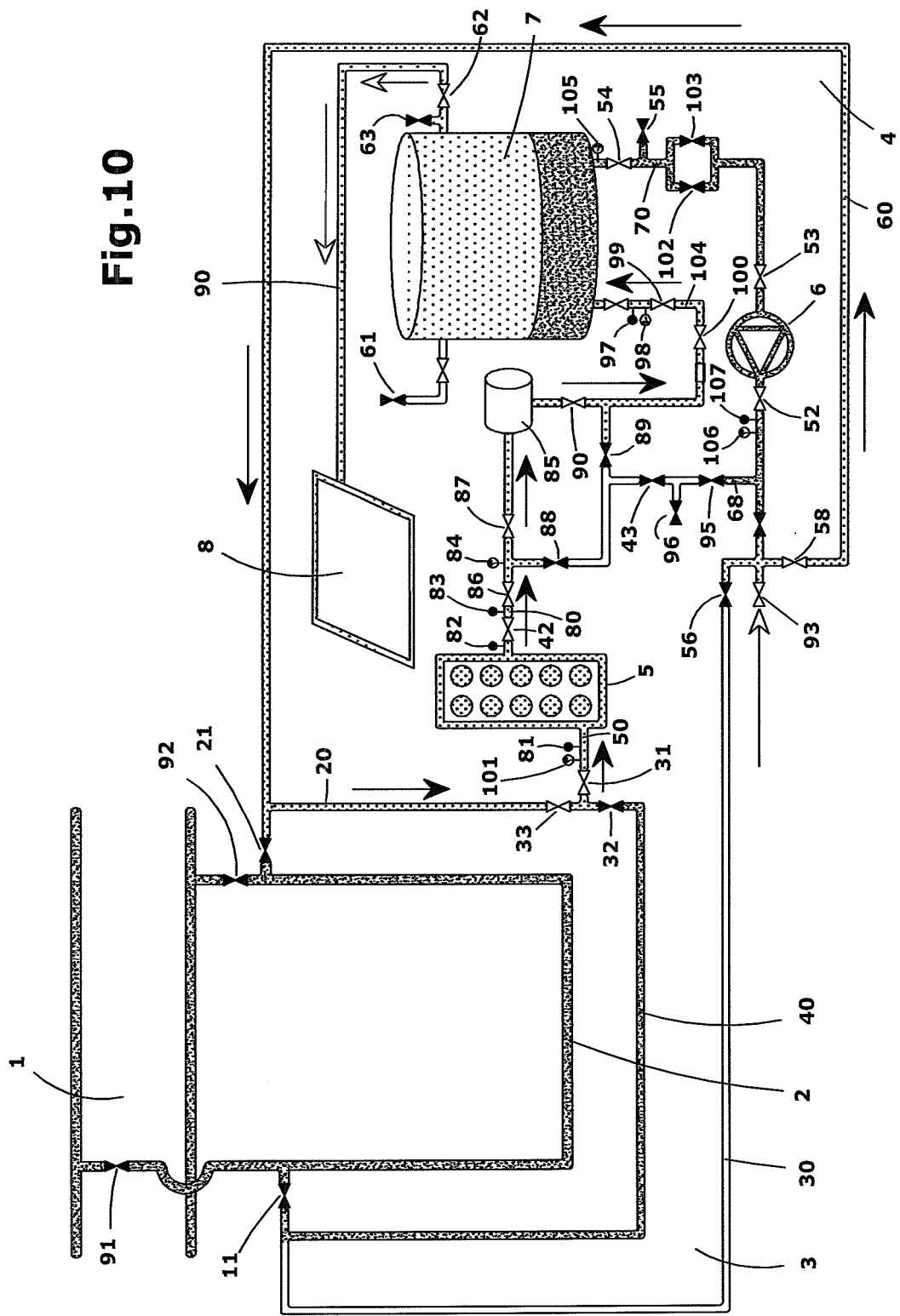
FIG. 10 shows a diagram of the auxiliary installation according to the invention working in a ninth phase, in which the suction system empties part of the conduits for connection with the loop of the thermal solar plant.
Figure 11:
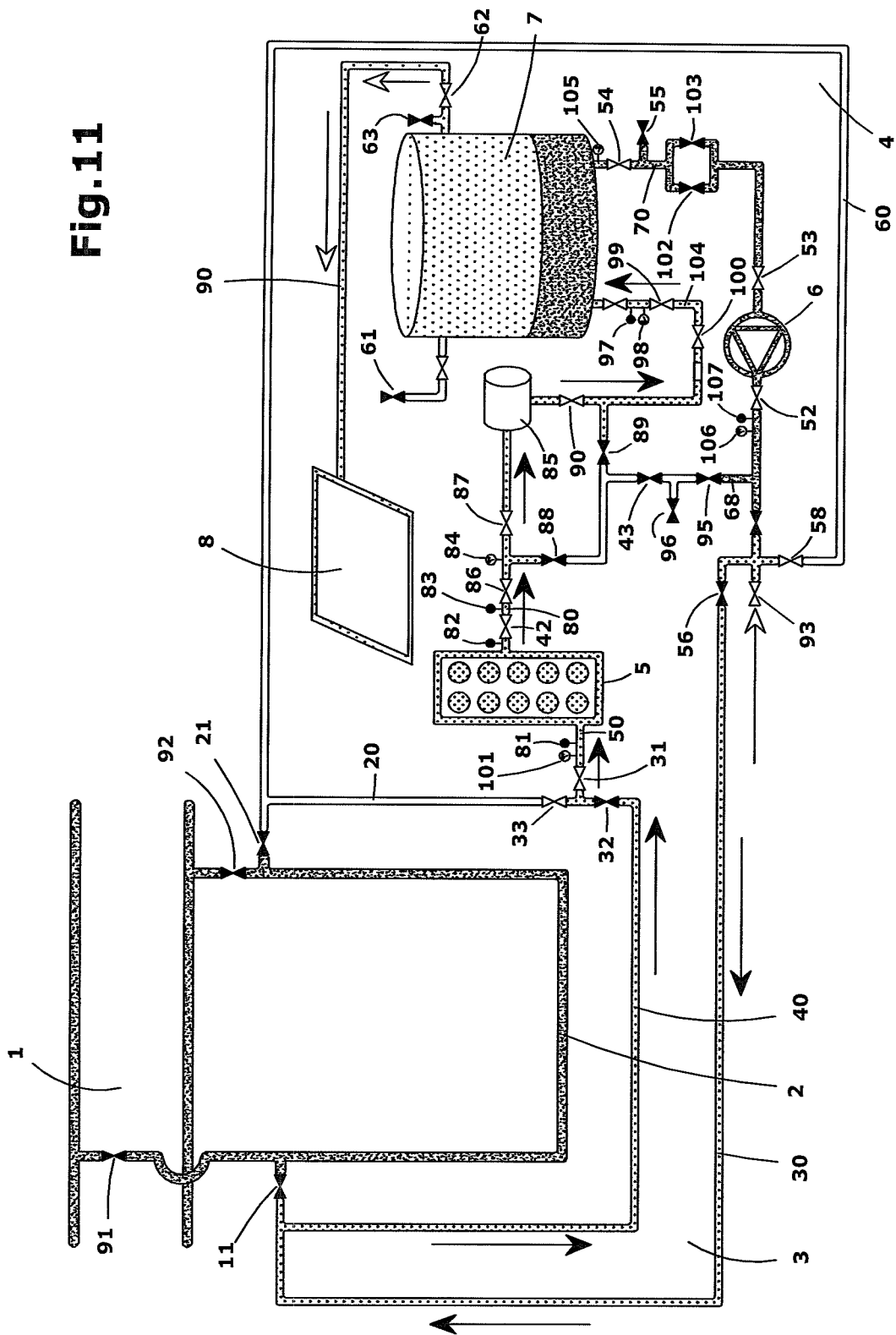
FIG. 11 shows a diagram of the auxiliary installation according to the invention operating in a tenth phase, in which the suction system also empties the other conduits for connection with the loop in the thermal solar plant and some of the apparatus in this auxiliary installation.

The explanation given below refers to "conduit" and "valve" identified with their numerical reference as shown in the figures.

As was briefly described above, an installation is described for drainage (emptying a loop of a thermal solar installation and filling this). The thermal solar installation comprises general conduits (1) and, isolated by means of valves (91, 92), a loop (2) of the plant corresponding to a group of solar collectors arranged in series and which has valves (21, 11) with external connection: the installation comprises:

An oil tank (7); this oil tank is connected to conduits (104, 70) and isolated by means of the corresponding manual valves (99, 54) respectively fitted in these conduits; the tank comprises an atmospheric intake by means of a preferably automatic valve (61); the inlet conduit (104) furthermore comprises a normally automatic valve (100), connected in series with this manual valve (99). The outlet conduit (70) also comprises an atmospheric intake (55) and a pair of valves (102, 103), normally one manual (103) and the other automatic (102) set in parallel; the inlet to the oil tank (7) also comprises a thermometer (97) and a manometer (98); the design also includes a manometer (105) in the outlet conduit (70) of the oil tank (7);

A pumping system (6) which can be in the form of a single pump or with several pumps fitted in parallel with simultaneous or alternating action; the pumping system (6) is isolated by means of the corresponding valves (53, 52) respectively arranged upstream and downstream of each pump; it also comprises, downstream, a thermometer (107) and a manometer (106);

A conduit (70) communicating the oil tank (7) and the pumping system (6);

An oil-cooling device (5); this is connected to conduits (50, 80), and isolated by valves (31 and 42) respectively; this includes a thermometer (81) before, and a thermometer (82) after, the oil cooler (5); there is also a manometer (101) at the inlet to the oil-cooling device (5);

A conduit (80) communicating the oil cooler (5) with the oil tank (7); the conduit (80) also comprises a second valve (86) for the outlet of the oil-cooling device (5), before which a thermometer (83) is fitted and after which there is a manometer (84); according to a preferential embodiment the conduit (80) comprises a fork with two branch circuits in parallel, in one of which there is a filter (85) isolated by the corresponding manual valves (87, 90); the other branch is not provided with a filter and has two manual valves (88, 89);

A conduit (68) communicating the outlet of the pumping system (6) with conduit (80), particularly between valves (88) and (89); this conduit (68) is fitted with preferably manual valves (95, 43), with an atmospheric intake (96) set between these;

An oil discharge branch circuit (4) towards the loop (2) of the thermal solar plant, which comprises a conduit (60) and a conduit (20); the free end of this oil discharge branch circuit (4) comprises means for connecting the valve (21) of the loop (2) of the plant, and is isolated by means of valves (33, 58) at its ends where it joins up with the set of apparatus;

An oil absorption branch circuit (3) towards the loop (2) of the thermal solar plant, which comprises a conduit (30) and a conduit (40); the free end of this oil discharge branch circuit (3) comprises means for connecting with valve (11) of the loop (2) of the plant and is isolated at its ends by means of valves (32, 56);

The conduit (50) for letting the oil into the cooling device (5) is connected between valves (32, 33) which close one of the conduits for each of the branch circuits (3, 4);

The conduit (68) is connected between valves (56, 58) after a valve (94), and comprises an atmospheric intake (93);

A depression or suction system (8) communicating with the oil tank (7) by means of a conduit (90), fitted with isolating valves (62), and a valve (63) for the atmospheric intake and safety.

Branch circuits (3, 4) only have a connection with the valves (11, 21) in the installation at one end, with no valve at all.

The installation is also designed to include a control system which evaluates the conditions of times, temperature and pressure at the different points and which commands the opening or closing of valves, according to each of the stages being implemented.

Even when some of the valves are designated as being manual or automatic, any of the valves can be manual or automatic depending on the degree of automation of the auxiliary installation of the invention, although it is useful for the different devices to be isolated by means of manual valves for their maintenance or replacement and the operating valves of the process are preferably automatic.

Different phases are implemented to carry out the drainage:

First of all the ends of each of the branch circuits (3, 4) are connected to the valves (11, 21) for the loop of the thermal solar plant; in this first status the loop is full of hot oil and the hoses are empty. Normally all the oil in the auxiliary installation of the invention will be in the oil tank (7), though possibly some of the isolated items, such as the pumping system (6) could be provided with cold oil. The valves for the whole installation are closed, though some may be open insofar as they do not let oil through into the connection branch circuits;

Then one of the branch circuits starts to be filled.

For the outlet branch circuit (3) (oil outlet from loop 2), valves (32,56) are opened and the inlet (50) and outlet (42) valves of the oil cooling device (5), valves (99, 100, 54) for inlet/outlet of the tank, at least one of the flow valves (102, 103) to the pumping system (6), and valves (53, 52, 94) which connect the pumping system with the installation must be open. Valves (88, 89) or (87, 90) must also be opened to allow flow between the oil cooling device (5) and the oil tank (7). The other valves have to stay closed.

For the inlet branch circuit (4) (oil inlet to loop 2), valves (33,58) are opened and it is also necessary to ensure that the inlet valves (50) and outlet (42) valves of the oil cooling device (5), the inlet/outlet valves (99, 100, 54) of the tank, at least one of the valves (102, 103) for flow to the pumping system (6), and valves (53, 52, 94) which connect the pumping system with the installation are all open. Valves (88, 89) or (87, 90) must also be open and the other valves have to stay closed, except for a valve (61) for the atmospheric intake of the oil tank (7).

It is possible, though not advisable, to fill both branch circuits (3,4) at the same time, to prevent bubbles and make proper use of the pumping pressure. The order in which the branch circuits (3,4) are filled does not matter. For filling the second branch circuit (4,3) the valves isolating the first one (3,4) do not have to be closed, although, as already stated, this would be advisable.

With the branch circuits (3, 4) full, valves (11, 21) for connection of the loop (2) of the thermal solar plant are opened, and valves (56,33), one for each branch circuit, are closed. Oil is pumped into the resulting auxiliary loop formed by conduits (60) and (40) respectively. The oil is pumped by the pumping system (6) from the oil tank (7) and driven through the conduit (60) through the loop (2), moving hot oil which comes out through conduit (40) and is led through conduit (50) to the cooling device (5). The temperature of the oil is measured before and after the cooler by means of thermometers (81, 84), as well as at other points in the installation, for example by means of thermometers (97) and (107), so that if the oil temperature is too high the pumping system will stop and the relevant valves will close, particularly the one for access to the oil tank (7) or to other devices, proceeding to reopen and activate this when this temperature has dropped to an appropriate threshold.

If the temperature at the outlet of the cooling device (5) is appropriate, the pumping will go on continuously until it is detected that the oil temperature at the inlet of this cooling device (5) is also cold, so that the loop is already cooled.

After completing the previous process valves (102, 103, 53, 52, 94) for access to the pumping system (6) are closed, with an atmospheric inlet valve remaining open (93), and the valve (61) for the atmospheric intake of the oil tank (7) closed. This thus activates a depression assembly (8) which produces suction in different phases:

In a first phase the suction takes place by absorbing air from the tank, and this in turn takes oil through the cooling device (5) of the auxiliary loop made up of the conduits (20), (40), (60); which are filled with air from the atmospheric intake (93);

In a second phase, with valves (11, 21) of the loop (2) of the plant open or closed, the oil from the branch circuits (3,4) is absorbed, except for the already empty conduit (60) by closing valve (58) and opening valves (56) and (33) respectively, taking the air through the atmospheric intake (93);

In these conditions the loop is empty and the appropriate action can be taken. The oil is in oil tank (7) of the auxiliary installation; this auxiliary installation can also be disconnected if the operations to be performed are expected to take any length of time.

The loop (2) of the plant is filled in a similar way to its draining. With the connections of the branch circuits (3,4) connected to the corresponding valves (11, 21), which can remain open or closed, the procedure is first of all to fill these branch circuits (normally the inlet one) of loop (2). The valves of the atmospheric intake, except for that of the oil tank (7) will be closed, as will also be the valves (56,32) of the outlet branch circuit (3). In this position, the pumping system (6) will be activated, to take oil from the oil tank (7) and drive this through the conduit (60), and through conduit (20) for filling the branch circuit (4).

With the branch circuit (4) full, valves (11, 21) are opened if these are not already open, and valve (40) of the outlet branch circuit, closing valve (33) of the inlet branch circuit (4). The pumping system (6) will thus drive the oil from the oil tank (7), to fill the loop (2) and the conduit (40) of the branch circuit (3). When the loop is full and sufficient oil has gone through this to carry away any possible impurities and bubbles, valves (11, 21) of the loop (2) are closed, this loop now being in operating condition.

Finally the absorption operation described above is repeated, in several phases, for emptying the branch circuits (3, 4) of the auxiliary installation of the invention. These are later collected after this operation has been completed and when the connections with the valves (11,21) have been disconnected.

This ensures results with a more automated auxiliary installation and is simpler to operate than a previous version of this device and method.

What is claimed is:

1. An auxiliary installation for draining thermal oil at a thermal solar plant, which includes main conduits and loops, each of the loops being isolated from said main conduits by first valves and with each loop corresponding to a set of solar collectors arranged in series, and further including second valves at ends of the loops for external connection, the auxiliary installation comprising the following elements: an oil tank; a pumping system; a depression/suction system; first conduits for communication with at least one of the second valves; a second conduit for communication between the oil tank and the pumping system; third conduits from the oil tank and pumping system for communication with at least one of the second valves; and a set of opening/closing flow valves between the oil tank, the pumping system; the depression/suction system and the first through third conduits; the first and third conduits for communication with the second valves each include a corresponding pair of hoses, one of the hoses in each pair connected to the other to form first and second closed loop branch circuits, each of these branch circuits having a connection at a free end thereof with a corresponding said second valve of the loop of the thermal solar plant, and without said branch circuits having any valves at their free ends.

2. An auxiliary installation for draining thermal oil at a thermal solar plant, according to claim 1, wherein one said branch circuit is isolated by means of valves.

3. An auxiliary installation for draining thermal oil at a thermal solar plant, according to claim 2, wherein the other branch circuit is isolated by means of valves.

4. An auxiliary installation for draining thermal oil at a thermal solar plant, according to claim 1, further comprising an oil cooling device.

5. An auxiliary installation for draining thermal oil at a thermal solar plant, according to claim 4, further comprising at least one of a conduit upstream of the oil cooling device and a conduit downstream of the oil cooling device.

6. An auxiliary installation for draining thermal oil at a thermal solar plant, according to claim 5, wherein each of the upstream and downstream conduits incorporate a valve.

7. An auxiliary installation for draining thermal oil at a thermal solar plant, according to claim 4, wherein the oil cooling device comprises at least one thermometer at an inlet thereof and a thermometer at an outlet thereof.

8. An auxiliary installation for draining thermal oil at a thermal solar plant, according to claim 4, wherein a circuit is formed comprised of, in order, the first said conduits of said first branch circuit for letting the oil out of a said loop, a fourth conduit, the oil cooling device, a fifth conduit, the oil tank, a sixth conduit and the pumping system.

9. An auxiliary installation for draining thermal oil at a thermal solar plant, according to claim 4, wherein a circuit is formed comprised of, in order, the first said conduits of the second branch circuit for letting the oil into a said loop, a fourth conduit, the oil cooling device, a fifth conduit, the oil tank, a sixth conduit and the pumping system.

10. An auxiliary installation for draining thermal oil at a thermal solar plant, according to claim 4, wherein a circuit is formed comprised of, in order, a first said conduit of the first branch circuit for letting the oil out of the loop, a fourth conduit, the oil cooling device, a fifth conduit, the oil tank, a sixth conduit and the pumping system, and a first said conduit of the second branch circuit for letting the oil into the loop, this circuit being completed with said loop to which the respective branch circuits are connected.

11. An auxiliary installation for draining thermal oil at a thermal solar plant, according to claim 8, wherein the fifth conduit comprises a fork with two branch circuits in parallel, in one of which a filter is located, isolated by corresponding valves and the other branch circuit does not have a filter and is fitted with at least one valve.

12. An auxiliary installation for draining the thermal oil at a thermal solar plant, according to claim 8, further comprising a seventh conduit for communication between the pumping system and at least one of the branch circuits in the fifth conduit.

13. An auxiliary installation for draining thermal oil at a thermal solar plant, according to claim 1, further comprising a control system which opens and closes the different valves and connects the elements included in the installation, depending on a phase and status of a drainage process.

14. A method for draining thermal oil at a thermal solar plant which comprises the following steps: connecting an end of branch circuits formed of two pairs of hoses at valves of a loop of the thermal solar plant; filling each of first and second branch circuits with oil from an oil tank by pumping the oil with a pumping system; opening the valves for connecting the loop of the thermal solar plant; scavenging oil in the loop through conduits of each of the branch circuits, with this oil circulating through a cooling system, and this scavenging step being performed by driving cold oil by the pumping system; providing suction by a depression/suction system of the oil from the branch circuits and taking this oil to the oil tank; and closing the valves of the loop of the thermal solar plant.

15. A method for draining thermal oil at a thermal solar plant, according to claim 14, further comprising the following steps: filling oil in the second branch circuit by opening corresponding valves in the second branch circuit and activating the pumping system; opening the valves in the loop and at least one valve in one of the conduits of the first branch circuit for the return of the oil, and closing at least one other valve in the conduits of the first branch circuit; forcing the oil through conduits of the first and second branch circuits and through the loop of the plant by the pumping system; closing at least one of the valves and stopping the pumping system; connecting the depression/suction system, opening corresponding valves to the depression/suction system and opening a valve for an atmospheric intake; and reeling in the hoses.

16. A method for draining thermal oil at a thermal solar plant, according to claim 14, at least some of said valves are automatic valves that are automatically opened and closed according to different selections, depending on requirements in each phase by means of an operating unit.

* * * * *